United States Patent Office 3,235,501
Patented Feb. 15, 1966

3,235,501
FOAM-INHIBITED OIL COMPOSITIONS
Hans F. Waldmann, Glassboro, N.J., assignor to Socony Mobil Oil Company, Inc., a corporation of New York
No Drawing. Filed June 11, 1962, Ser. No. 201,307
6 Claims. (Cl. 252—49.6)

This invention relates to the inhibition of foam in oil compositions containing materials which normally tend to promote foaming of the composition. More particularly, the invention relates to such oil compositions to which have been added silicone polymers and special inhibitors.

In the preparation of oil compositions for use as hydraulic fluids, as lubricants and the like, various additives are used to prevent sludging, deposition of gum and resinous materials, or similar objectionable results. These additives are generally in the nature of detergents which are effective for the intended purposes, but, characteristically, increase the foaming tendencies of the oil composition. To overcome this problem, silicone polymers have been employed in the prior art with some degree of success. Unfortunately, however, the silicones which initially do suppress foaming, lose their effectiveness in a relatively short period of time. Many materials have been suggested for prolonging the foam-inhibiting action of the silicones with generally indifferent success.

According to the present invention, it has now been found that oil compositions containing detergent additives which promote foaming and silicone polymer anti-foamants may be kept substantially foam free by incorporating into the compositions, a small amount of a polyalkyl oxylated aliphatic amine. These polyalkoxylated amines, which are referred to hereinafter as inhibitors, are prepared by reacting the amine with either ethylene oxide or propylene oxide, or a mixture thereof. The reaction is generally carried out at elevated temperatures in the presence of a basic catalyst, such as an alkali metal hydroxide, employing a mol ratio of ethylene oxide or propylene oxide to the amine which will provide the desired number of ethoxy or propoxy units in the resulting alkoxylated product. The amines suitable for the invention include primary and secondary mono- and di-amines. It will be understood that where the amine reactant contains more than one amine hydrogen, as in the case of a primary amine and certain di-amines, the ethoxylation (or propoxylation) may occur at one or more or all of such hydrogens. Generally, the reaction is a random one and a single alkoxylated compound is not obtained, but a mixture of alkoxylated compounds, the product in any particular case being identified by the average number of alkoxide groups incorporated into the amine. The alkoxylated amines contemplated by the invention may suitably contain from 1 to about 25, preferably from 1 to about 15 ethylene oxide (—CH$_2$CH$_2$O—) and/or propylene oxide (—CH$_2$—CHO—)
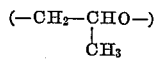

radicals, (i.e., mols) per mol of amine component therein.

As non-limiting examples of amines suitable for preparing the inhibitors of the invention there may be mentioned mono-amines, such as butyl amine, octyl amine, di-butyl amine, lauryl amine, oleyl amine, octadecyl amine, abietyl amine and eicosyl amine, and di-amines, such as N-octyl-1,3-trimethylene di-amine, N-dodecyl-1,3-trimethylene di-amine, N-octadecyl-1,3-trimethylene di-amine, N-octadecyl-1,6-hexamethylene di-amine and N-octyl, N'-oleyl dimethylene di-amine. Various mixtures of amines which are available commercially, such as "Primene-81-R" and "Primene-JMT" (Rohm & Haas Company brochure, September 1954) and the various "Armeens" and "Duomeens" (Armour and Company brochure, 1954) are also suitable for use in the invention. Specific amine mixtures are, for example, (1) "Armeen-C," which is composed of approximately 9% octyl, 9% decyl, 47% dodecyl, 18% tetradecyl, 8% hexadecyl, 5% octadecyl and 5% octadecenyl amines, (2) "Armeen-T," which is composed of approximately 2% tetradecyl, 24% hexadecyl, 28% octadecyl and 46% octadecenyl amines, (3) "Armeen-S," composed of approximately 20% hexadecyl, 17% octadecyl, 26% octadecenyl and 30% octadecadienyl amines and (4) "Duomeen-T," a mixture of propylene di-amines having the formula RNHCH$_2$CH$_2$CH$_2$NH$_2$ where R is composed of approximately 2% tetradecyl, 24% hexadecyl, 28% octadecyl and 46% octadecenyl radicals.

It will be seen that the alkoxylated amines of the invention will conform to one of the following formulae depending on whether the amine from which they are prepared is a mono- or di-amine:

(1)
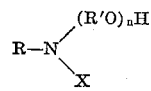

where R is an aliphatic radical of from about 4 to about 24 carbon atoms, R'O is an alkylene oxide radical selected from the group consisting of ethylene oxide and propylene oxide radicals, n is an integer from 1 to about 25 and X is selected from hydrogen, R and —(R'O)$_n$H radicals, the total value of n in any instance being no greater than 25 and (2)
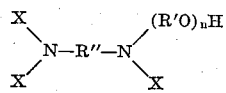

where R'' is an aliphatic radical having from 2 to about 6 carbon atoms, R'O, n and X are defined in Formula 1 but at least one X is an R radical and the total value of n in any instance being no greater than about 25.

As is well known, one class of detergent additives commonly used in lubricating oil compositions are the oil-soluble metal salts of high molecular weight (300–1000) sulfonic acids, such as petroleum-derived sulfonic acids and synthetic alkyl-aryl sulfonic acids having from about 8 to about 24 carbon atoms in the alkyl portion thereof, the alkaline earth metal salts being generally preferred. Thus, normal and basic (sometimes referred to as complex or over-based) calcium and barium sulfonate salts which may or may not have been treated with carbon dioxide are widely used.

Another preferred class of detergents are the metal salts of alkylphenol sulfides, such as, for example, the normal or basic (complex) barium and calcium salts of amyl- and nonyl-substituted phenol sulfides. Such salts are fully described in the prior art. See, for example, U.S. Patents Nos. 2,451,345, 2,362,289 and 2,916,454.

Metal salts of phosphorus sulfide-hydrocarbon reaction products, particularly the alkaline earth metal salts, are also well known oil detergents, especially the barium salts. Specific salts of this character are the metal salts of phosphosulfurized polyolefins, such as the barium salts of $P_2S_5$-polypropylene reaction products. Salts of this type are fully described, for example in U.S. Patents Nos. 2,316,080, 2,316,082, 2,316,088 and 2,806,022.

While the foregoing classes of detergent additives have been mentioned as illustrative, it will be appreciated that the principle of the present invention may be successfully applied to any oil composition containing one or more detergents which increase the foaming tendencies thereof. Also, oil compositions containing additional additives along with the foam-inducing additives, such as conventional antioxidants, pour point depressants, extreme pressure agents and the like may be improved (with respect to their foaming tendencies) by the invention.

(Oil A) was blended with a typical dimethyl silicone polymer alone and with the same silicone polymer and various inhibitors typical of the invention. These compositions and also the SAE-50 grade base oil alone (no additives) and a blend of the base oil with the dimethyl silicone were then tested for foam tendency (cubic centimeters of foam after 5 minutes aeration) and foam stability (cubic centimeters of foam after 10 minutes standing), according to Sequence 1 of ASTM foam test, D-892-46T. The tests were carried out one day after preparation of the various blends (i.e., Oil A plus either silicone or silicone and inhibitor) and were repeated after 14 days and after 75 days. The results of the tests are summarized in Table I in which "EO" and "PO" with their preceding numbers represent the average number of ethylene oxide and propylene oxide units, respectively, in the alkoxylated amine used as the inhibitor and wherein "FT" stands for foaming tendency and "FS" stands for foam stability.

*Table I*

| Inhibitor | Percent Inhibitor Added | Silicone Polymer [1] (p.p.m.) | FT/FS (cm.³) | | |
|---|---|---|---|---|---|
| | | | After 1 Day | After 14 Days | After 75 Days |
| Oil A | None | 2 | 600/610 | 670/610 | |
| "Armeen-C" plus 2 EO | 0.3 | 2 | 5/0 | 20/0 | 80/0 |
| Octadecyl Amine plus 2 EO | 0.1 | 2 | 15/0 | 510/30 | 470/20 |
| Octadecyl Amine plus 2 EO | 0.3 | 2 | 0/0 | 0/0 | 0/0 |
| Octadecyl Amine plus 5 EO | 0.3 | 2 | 5/0 | 40/0 | 160/0 |
| "Armeen-T" plus 2 EO | 0.3 | 2 | 5/0 | 10/0 | 40/0 |
| "Armeen-T" plus 5 EO | 0.1 | 2 | 0/0 | 0/0 | 5/0 |
| "Armeen-T" plus 5 EO | 0.05 | 4 | 0/0 | 0/0 | 15/0 |
| Octadecenyl Amine plus 5 EO | 0.1 | 2 | 0/0 | 15/0 | 25/0 |
| Octadecenyl Amine plus 5 EO | 0.05 | 4 | 0/0 | 5/0 | 15/0 |
| "Armeen-S" plus 2 EO | 0.3 | 2 | 0/0 | 5/0 | 25/0 |
| "Duomeen-T" plus 3 EO | 0.3 | 2 | 10/0 | 90/0 | 470/60 |
| "Duomeen-T" plus 10 EO | 0.1 | 2 | 20/0 | 40/0 | 100/0 |
| "Armeen-T" plus 2 PO | 0.1 | 2 | 0/0 | 0/0 | 0/0 |
| "Armeen-T" plus 15 PO | 0.2 | 2 | 200/30 | 30/0 | 20/0 |

[1] Dow-Corning Fluid-200, 60,000 cs. at 25° C.

The silicone polymers are compounds well known in the art. The dimethyl silicones which are the ones most commonly employed vary widely in molecular weight depending on the length of the polymer chain and are generally characterized by their viscosities as determined at 25° C. These silicones have the general formula:

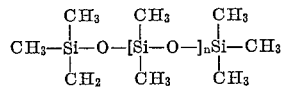

where $n$ is a number having an average value such that the silicone polymer has a viscosity at 25° C. of from about 3.0 to about 1,000,000 cs. and preferably from about 300 to about 100,000 cs. Similar polymers having longer alkyl groups and/or aryl groups are also suitable for the invention.

A full understanding of the invention will be had from the following examples in which all of the percentages given are by weight.

EXAMPLES

A series of foaming tests was conducted using an oil composition composed of 95.35% of an SAE-50 grade lubricating oil and 4.65% of typical commercial detergent additives as follows: (1) 2% of an oil concentrate (10% Ba) of a complex carbonated barium nonylphenol sulfide; (2) 0.9% of an oil concentrate (9.5% Ba) of a mixture of sulfurized barium alkylphenate and phosphosulfurized polybutene barium salt; (3) 1.0% of an oil concentrate (10% Ba) of a basic barium wax-benzene sulfonate; and (4) 0.75% of an oil concentrate (8% Zn) of zinc dihexyl dithiophosphate. This oil composition A second series of foaming tests was conducted after the fashion of the preceding series employing an oil composition prepared with the 50-SAE grade base oil used in Oil A and containing three of the additives used in Oil A in the following amounts based on the total composition: 1.5% additive (1), 1.5% additive (3) and 0.5% additive (4). In these tests the 50-SAE grade base oil without additives, the compounded oil (Oil B) and the compounded oil having added thereto varying amounts of the same silicone polymer used in the first test series were tested with the results shown in Table II. The tests were conducted 1 day after the blends (Oil B plus the silicone) were prepared.

*Table II*

| | Silicone Added, p.p.m. | Foam FT/FS (cm.³) |
|---|---|---|
| Base Oil (No Additives) | None | 400/10 |
| Base Oil (No Additives) | 1.5 | 0/0 |
| Oil B | None | 670/630 |
| Oil B | 1.5 | 600/500 |
| Oil B | 3.0 | 540/400 |
| Oil B | 4.5 | 530/330 |
| Oil B | 10.0 | 650/480 |

These test results clearly show that although the silicone polymer is an effective foam-inhibitor in the uncompounded oil it is practically ineffective as a foam inhibitor in the compounded oil, even when employed in relatively large amounts.

Portions of Oil B were then mixed with 1.5 p.p.m. of the same silicone polymer and to the mixture was added small amounts of the inhibitors of the invention and these compositions tested for foaming after storage. The results are shown in Table III.

*Table III*

| Inhibitor | Percent Inhibitor Added | Silicone Polymer [1] (p.p.m.) | FT/FS (cm.³) After 1 Day | FT/FS (cm.³) After 14 Days | FT/FS (cm.³) After 75 Days |
|---|---|---|---|---|---|
| Oil B | None | 1.5 | 660/610 | 670/620 | |
| "Armeen-C" plus 2 EO | 0.3 | 1.5 | | 5/0 | 15/0 |
| "Armeen-C" plus 10 EO | 0.3 | 1.5 | 450/350 | 10/0 | |
| "Armeen-T" plus 2 EO | 0.3 | 1.5 | 0/0 | 5/0 | 110/0 |
| "Armeen-T" plus 5 EO | 0.3 | 1.5 | 0/0 | 0/0 | 25/0 |
| "Armeen-T" plus 5 EO | 0.05 | 1.5 | 0/0 | 15/0 | 30/0 |
| Octadecyl Amine plus 5 EO | 0.3 | 1.5 | 0/0 | 20/0 | 370/20 |
| Octadecyl Amine plus 5 EO | 0.3 | | 270/10 | 560/20 | 650/570 |
| Octadecyl Amine plus 10 EO | 0.3 | 1.5 | 180/30 | 660/600 | |
| "Armeen-S" plus 2 EO | 0.3 | 1.5 | 0/0 | 5/0 | 20/0 |
| Rosin Amine [2] plus 2 EO | 0.3 | 1.5 | 0/0 | 0/0 | 70/0 |
| Rosin Amine [2] plus 5 EO | 0.3 | 1.5 | 0/0 | 5/0 | 90/0 |

[1] Dow-Corning Fluid-200, 60,000 cs. at 25° C.
[2] Approximately 90% Abietyl Amine.

In a further series of foaming tests, an oil composition (Oil C) comprised of 96.25% of an SAE-50 grade lubricating oil, 3% of a barium salt of a phosphosulfurized polybutene detergent and 0.75% of zinc dihexyl dithiophosphate antioxidant was employed. In these tests the same silicone polymer employed in the previous tests was added initially to the oil composition and after 14 days storage an inhibitor typical of the invention was added whereby a substantial drop in the foaming tendency and stability of the composition was effected. These test results are summarized in Table IV.

*Table IV*

| Inhibitor | Percent Inhibitor Added | Silicone Polymer [1] (p.p.m.) | FT/FS (cm.³) After 1 Day | FT/FS (cm.³) After 14 Days | FT/FS (cm.³) After 32 Days |
|---|---|---|---|---|---|
| Oil C | None | 2 | 350/180 | 640/550 | |
| "Armeen-T" | 0.2 | 2 | | 160/30 | 160/30 |

[1] Dow-Corning Fluid-200, 60,000 cs. at 25° C.

It will be apparent from the foregoing examples and tests that the inhibitors of the present invention act to prevent any substantial foaming and such foam as may be formed initially is merely transient and disappears substantially completely before expiration of the 10-minute standing period called for by the standard test. It is considered especially significant that these inhibitors continue to act as foam inhibitors even after as much as 75 days. A further feature of this invention lies in the fact that the inhibitors are effective with even very small amounts of the silicone.

From the standpoint of economy it is, of course, desirable that the amount of inhibitor as well as the amount of silicone polymer added to the oil composition be kept to a minimum. It has been found that as little as 1-2 parts per million of silicone is effective with as little as 0.01% of inhibitor. The amounts of silicone and inhibitors used, however, will depend on the nature and/or amount of the detergent additives present in the oil composition. Generally, the detergent additives are employed in various oil compositions in amounts ranging from about 0.5% to about 30%, usually from 1% to about 5%. As a rule, the amount of silicone polymer will be between about 0.5 and about 10.0 parts per million, while the amount of inhibitor used will be between 0.01% and 1.0%, and preferably between about 0.03% and about 0.3%. Obviously, amounts of silicone and/or inhibitor substantially greater than these relatively small amounts can be employed without lessening of the anti-foaming benefits of the invention. Accordingly, it will be understood that the use of such higher amounts is within the spirit and scope of the invention.

It is pointed out that all of the percentage amounts stated hereinabove and in the appended claims are on a weight basis.

Although the invention has been described herein in terms of specific embodiments and examples thereof, it is not intended that the scope thereof be limited in any way thereby, but only as indicated in the following claims.

What is claimed is:

1. A foam inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 to about 1,000,000 cs. and (b) a minor amount, from about 0.01% to about 1.0% of an alkoxylated amine having from about 8 to about 18 carbon atoms containing from 2 to 5 alkylene oxide groups per mole of amine wherein said alkylene oxide is selected from the group consisting of ethylene oxide and propylene oxide.

2. A foam inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 to about 1,000,000 cs. and (b) a minor amount, from about 0.01% to about 1.0% of an ethoxylated octadecyl amine containing 5 ethylene oxide groups per mole of amine.

3. A foam inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 to about 1,000,000 cs. and (b) a minor amount, from about 0.01% to about 1.0% of an ethoxylated mixture of amines having predominantly 12 to 14 carbon atoms, said mixture containing 2 ethylene oxide groups.

4. A foam inhibited mineral oil composition comprising a major proportion of mineral oil, a minor amount, from about 0.5% to about 30%, of an oil-soluble detergent additive which normally increases the foam-forming tendency of said composition and as a foam-inhibiting combination (a) a minor amount, from about 0.5 to about 10 parts per million, of a dimethyl silicone polymer having a viscosity at 25° C. of from about 3.0 to about 1,000,000 cs. and (b) a minor amount, from about 0.01% to about 1.0% of ethoxylated rosin amine containing 2 to 5 ethylene oxide groups.

5. The composition of claim 1 wherein the alkoxylated amine is a mixture of amines composed of approximately 2% tetradecyl, 24% hexadecyl, 28% octadecyl and 46% octadecenyl trimethylene diamines, said mixture containing from 2 to 5 ethylene oxide groups per mol of amine.

6. The composition of claim 1 in which the alkoxylated amine is a mixture of amines composed of approximately 2% tetradecyl, 24% hexadecyl, 28% octadecyl and 46% octadecenyl amines, said mixture containing from 2 to 5 propylene oxide groups per mol of amine.

References Cited by the Examiner
UNITED STATES PATENTS

| | | | |
|---|---|---|---|
| 2,085,709 | 6/1937 | Steibert | 252—9.23 |
| 2,701,239 | 2/1955 | Ryznar | 252—321 |
| 2,972,579 | 2/1961 | Delfel | 252—358 |

OTHER REFERENCES

Ross: "Chemical Antifoaming Agents," Chemical Industries, May 1949, pp. 757–759.

DANIEL E. WYMAN, *Primary Examiner.*

JULIUS GREENWALD, *Examiner.*